United States Patent
Ohtomo et al.

(10) Patent No.: US 6,253,457 B1
(45) Date of Patent: Jul. 3, 2001

(54) LASER BEAM DIRECTION CORRECTING OPTICAL SYSTEM FOR A SURVEYING INSTRUMENT

(75) Inventors: Fumio Ohtomo; Ikuo Ishinabe; Jun-ichi Kodaira, all of Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/140,338

(22) Filed: Aug. 26, 1998

(30) Foreign Application Priority Data

Aug. 26, 1997 (JP) .................................................. 9-228743

(51) Int. Cl.⁷ .............................. G01C 5/00; G01C 1/00; G02B 23/00
(52) U.S. Cl. .................................. 33/290; 33/281; 33/282; 33/285; 33/286; 33/DIG. 21; 356/138; 359/364; 359/423
(58) Field of Search ............................. 33/281, 282, 285, 33/286, 290, DIG. 21; 359/364, 423; 356/138

(56) References Cited

U.S. PATENT DOCUMENTS

| 3,237,518 | * | 3/1966 | Krajowsky | 359/364 |
| 3,588,249 | * | 6/1971 | Studebaker | 33/DIG. 21 |
| 3,627,429 | * | 12/1971 | Jaenicke | 33/DIG. 21 |
| 3,918,813 | * | 11/1975 | Rossiter | 33/285 |
| 5,703,718 | * | 12/1997 | Ohtomo et al. | 33/286 |
| 5,929,983 | * | 6/1999 | Lu | 356/138 |
| 6,018,416 | * | 1/2000 | Mihara | 359/423 |
| 6,034,763 | * | 3/2000 | Slater et al. | 356/138 |
| 6,088,156 | * | 7/2000 | Kato | 359/423 |
| 6,091,487 | * | 7/2000 | Jackson et al. | 356/138 |
| 6,097,537 | * | 8/2000 | Takahashi et al. | 359/364 |
| 6,137,569 | * | 10/2000 | Sasaki et al. | 356/138 |

* cited by examiner

Primary Examiner—Diego Gutierrez
Assistant Examiner—Yaritza Guadalupe
(74) Attorney, Agent, or Firm—Foley & Lardner

(57) ABSTRACT

A laser beam direction correcting optical system for a surveying instrument comprises a laser light source (1) for emitting a laser beam, an exit angle correcting system (17) for correcting an exit angle of the laser beam emerging therefrom in accordance with an inclination of an instrument main body so that the laser beam is oriented in a specific direction, and an incident angle correcting system provided between the laser light source (1) and the exit angle correcting system (17) to correct an incident angle of the laser beam incident upon the exit angle correcting system in accordance with the inclination of the instrument main body. The exit angle correcting system (17) comprises an objective lens (19), the objective lens (19) being constituted by a variable-focus lens in which a position of a principal plane thereof on an optical axis thereof is fixed and also which can vary a position at which an image of the laser beam is formed.

5 Claims, 9 Drawing Sheets

LASER BEAM DIRECTION CORRECTING OPTICAL SYSTEM FOR A SURVEYING INSTRUMENT

BACKGROUND OF THE INVENTION

1. Field of the Invention

The present invention relates to an improvement in a laser beam direction correcting optical system for a surveying instrument which emits a laser beam in a specific direction.

2. Description of the Related Art

Some of the surveying instruments have a rotating laser emitting device which rotates laser light within a horizontal plane to generate a reference plane. FIG. 9 shows an example of the rotating laser emitting device. This rotating laser emitting device is equipped with a visible semiconductor laser 1 as a laser light source, a collimator lens, an incident angle correcting means 3, and a laser rotating-scanning means 4.

The visible semiconductor laser 1 is driven by a pulse drive circuit 5 consisting of an oscillator 5a and an LD drive circuit 5b. The collimator lens 2 converts the laser light emitted from the visible semiconductor laser 1 to a collimated light beam P1. The collimated light beam P1 is incident upon the incident angle correcting means 3.

The laser rotating-scanning means 4 is equipped with a vertical-direction orienting means 6 and a pentagonal prism 7 which reflects the laser light incident upon the orienting means 6 in a horizontal direction. The pentagonal prism 7 is mounted on a rotary mounting table 8 so that it can rotate. With rotation of this pentagonal prism 7, the laser light is rotated within a horizontal plane and emitted to an irradiated object.

The incident angle correcting means 3 is equipped with an in-X plane inclination correcting means and an in-Y plane inclination correcting means perpendicular to the in-X plane inclination correcting means. The in-X plane inclination correcting means is constituted by an oil bath 10, enclosed glasses 11 and 12, and oil 13 enclosed within the oil bath 10. The in-Y plane inclination correcting means is constituted by a pair of prisms 14 and 15. The oil 13 is horizontally maintained regardless of an inclination of the instrument main body. The direction of reflection of the collimated light beam P1 within an X plan is corrected according to an inclination of the instrument main body by the back surface 13a of the oil 13, and the corrected light beam P1 is guided to the in-Y plane inclination correcting means. The inclination of the guided light beam P1 within a Y plane is corrected by the in-Y plane inclination correcting means, and the corrected light beam P1 is guided to the vertical-direction orienting means 6. The incident angle correcting means 3 is interposed between the visible semiconductor laser 1 and the vertical-direction orienting means 6. The incident angle correcting means 3 fulfills a role of correcting an incident angle of the collimated light beam P1 incident upon the vertical-direction orienting means 6 in accordance with an inclination of the instrument main body.

The vertical-direction orienting means 6 consists of a reflecting mirror 16 and an exit angle correcting means 17. The exit angle correcting means 17 consists of a first objective lens 18 and a second objective lens 19. This exit angle correcting means 17 fulfills a role of correcting an exit angle of the laser light beam emerging from the second objective lens 19 in accordance with an inclination of the instrument main body so that the laser light beam is oriented in a specific direction (e.g., a vertical direction).

Incidentally, in surveying instruments, a distance to an irradiated object is not constant, and in order to make emission efficiency variable in accordance with each distance, there have been demands that a function of focusing laser light on an irradiated object be added to the exit angle correcting means 17. More specifically, there have been demands that laser light be emitted to an irradiated object not as a collimated light beam but as an image forming light beam.

Particularly, in the case of visible laser light, if laser light is emitted as a collimated light beam, the laser light will become more difficult to see as distance increases. For this reason, it is desirable that the image of laser light be formed in an irradiated object.

In the conventional rotating laser light emitting device, however, laser light is incident upon the exit angle correcting means 17 after it has been corrected by the incident angle correcting means 3. For this reason, if the first objective lens 18 of the exit angle correcting means 17 is moved in the optical axis O of the correcting means 17 so that laser light is focused on an irradiated object, then the laser light emerging from the second objective lens 19 will be shifted from a specific direction. Therefore, the problem of degrading correction accuracy in the exit angle of an outgoing light beam arises for the following reasons.

As shown in FIG. 10($a$), the incident angle of a collimated light beam incident upon the first objective lens 18 relative to the optical axis O of the exit angle correcting means 17 is taken to be $\theta_{in}$. Also, the exit angle of the collimated light beam P1 emerging from the second objective lens 19 relative to the optical axis O of the exit angle correcting means 17 is taken to be $\theta_{out}$. The focal length of the first objective lens 18 is taken to be fa, and the focal length of the second objective lens 19 is taken to be fb. Assuming the focal point of the first objective lens 18 and the focal point of the second objective lens 19 are consistent with each other, the image of the collimated light beam incident upon the first objective lens 18 will be formed temporarily at the focal position fa and have an image height Y. Then, the incident light is emitted again from the second objective lens 19 as a collimated light beam. At this time, between the incident angle $\theta_{in}$ of the incident light beam and the exit angle $\theta_{out}$ of the outgoing light beam, the following relation is established:

$$\theta_{out} = r \cdot \theta_{in}$$

where r is angular magnification (fa/fb).

Next, as shown by a broken line in FIG. 10($b$), by moving the second objective 19 by $\Delta X$ in a direction of arrow along the optical axis O, the image of the laser light is formed in an irradiated object. In this case, in accordance with a distance from the second objective lens 19 to the irradiated object, an error $\Delta\theta_{out}$ occurs in the exit angle $\theta_{out}(S)$ of an outgoing light beam when the outgoing light beam is emitted to infinity, so that correction accuracy in the exit angle of the outgoing light beam is degraded. Reference character S denotes a distance from the second objective lens 19 to an irradiated object in the optical axis direction (i.e., a distance to an image-formed position).

SUMMARY OF THE INVENTION

The present invention has been made in view of the aforementioned disadvantages. Accordingly, it is an object of the present invention to provide a laser beam direction correcting optical system for a surveying instrument which is capable of imaging laser light in an irradiated object while avoiding correction accuracy degradation in the exit angle of an outgoing light beam.

To achieve this end and in accordance with one important aspect of the present invention, there is provided a laser beam direction correcting optical system for a surveying instrument, comprising: a laser light source for emitting laser light; an exit angle correcting means for correcting an exit angle of the laser light emerging therefrom in accordance with an inclination of an instrument main body so that the laser light is oriented in a specific direction; and an incident angle correcting means provided between the laser light source and the exit angle correcting means to correct an incident angle of the laser light incident upon the exit angle correcting means in accordance with the inclination of the instrument main body; wherein the exit angle correcting means comprises an objective lens, the objective lens being constituted by a variable-focus lens in which a position of a principal plane thereof on an optical axis thereof is fixed and also which can vary a position at which an image of the laser light is formed.

In a preferred form of the invention, the objective lens is constituted by a group of lenses.

In accordance with another important aspect of the present invention, there is provided a laser beam direction correcting optical system for a surveying instrument, comprising: a laser light source for emitting laser light; an exit angle correcting means for correcting an exit angle of the laser light emerging therefrom in accordance with an inclination of an instrument main body so that the laser light is oriented in a specific direction; and an incident angle correcting means provided between the laser light source and the exit angle correcting means to correct an incident angle of the laser light incident upon the exit angle correcting means in accordance with the inclination of the instrument main body; wherein the exit angle correcting means comprises two groups of objective lenses, a position of a complex principal plane of the objective lenses on an optical axis thereof being fixed.

In a preferred form of the invention, at least one of the two groups of objective lenses is movable along the optical axis.

In another preferred form of the invention, among the two groups of objective lenses the objective lens located near the light source is movable.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
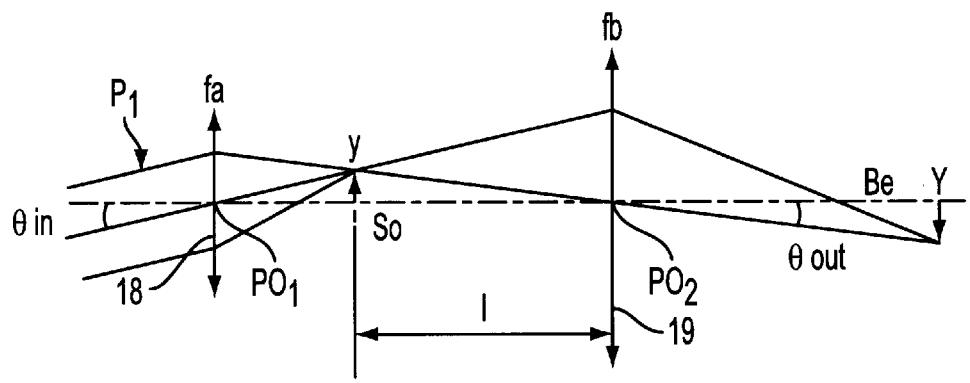
FIG. 1 is an optical schematic diagram used to explain the principle of the present invention.
Figure 10A:
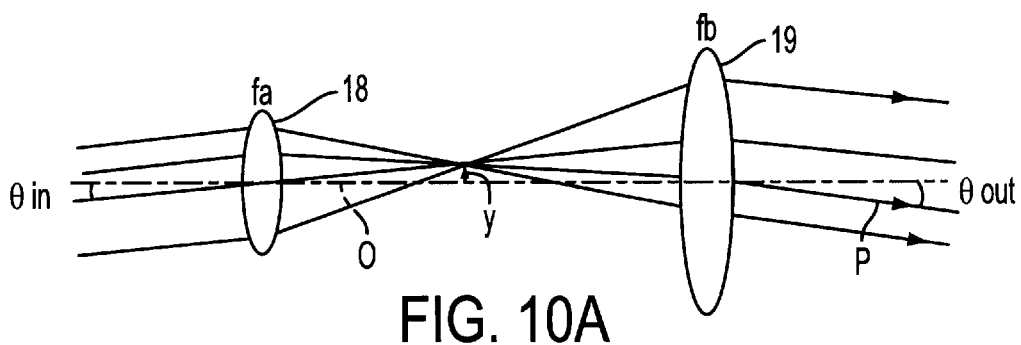
FIG. 10 is a diagram used to explain the disadvantages of the conventional laser beam direction correcting optical system, FIG. 10(a) being a diagram used to explain the relation between lenses in the case of emitting laser light to infinity and FIG. 10(b) being a diagram used to explain the offset between the exit angle of laser light when the image of the laser light is formed at a finite distance and the exit angle of laser light when it is emitted to infinity.
Figure 10B:
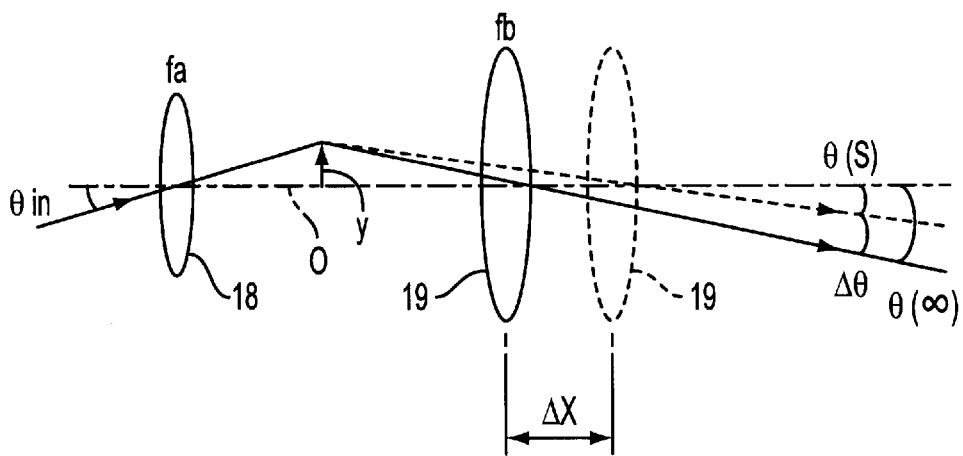

For making an understanding of the present invention easy, a description will be made on the assumption that objective lenses 18 and 19 are thin wall ones as shown in FIG. 1. The positions PO1 and PO2 on the objective lenses 18 and 19 on an optical axis O thereof indicate the positions of the principal planes of the lenses, respectively. Laser light emitted from a visible semiconductor laser 1 (laser light source) is converted to a collimated light beam P1. The collimated light beam P1 is incident upon the first objective lens 18 with a focal length $f_a$, and a light source image $S_O$ with an image height y is formed. At this time, the incident angle of the light beam P1 incident upon the first objective lens 18 is $\theta_{in}$. The light source image $S_O$ with an image height y is projected on an irradiated object by the second objective lens 19 with a focal distance fb. The second objective lens 19 is located away from the light source image $S_O$ in the optical axis direction by distance I. If the distance I and the focal length fb are equal to each other, the laser light emitted from the second objective lens 19 will be emitted as a collimated light beam, and the exit angle of the outgoing light beam will be $\theta_{out}$. If the distance I is greater than the focal length fb, the laser light emitted from the second objective lens 19 will be an image forming light beam.

Therefore, if the position PO2 of the principal plane of the second objective lens 19 is fixed and if the focal length fb of the second objective lens 19 is varied so as to be less than the distance I, an image forming light beam can be obtained. Also, the exit angle $\theta_{out}$ of the outgoing light beam from the second objective lens 19 is determined by a ratio between the distance I and the image height y (y/I). Therefore, if the position PO2 of the principal plane of the second objective lens 19 is fixed, the exit angle $\theta_{out}$ of the outgoing light beam will not vary. In FIG. 1, reference character Be denotes a secondary light source image with an image height Y, obtained by the second objective lens 19.

Hence, the following embodiments will be adopted.

First Embodiment

Figure 2:
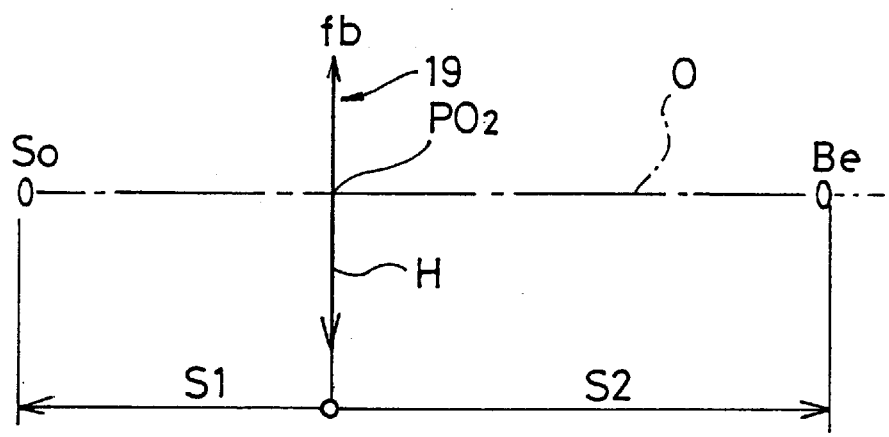
FIG. 2 is an optical schematic diagram of a first embodiment of the present invention.

The second objective lens 19 is constituted by a variable-focus lens employing a liquid lens, a liquid crystal, or the like. As shown in FIG. 2, a distance from a light source image $S_O$ to the second objective lens 19 is taken to be S1 (which is the same as the distance I described in the principle of the present invention), while a distance from the second objective lens 19 to an image formed position is taken to be S2. Assuming the direction to the right of the position PO2 of the principal plane of the second objective lens 19 on the optical axis O is positive and that the direction to the left of the position PO2 is negative, image forming equations can be expressed as:

$$1/S2 = 1/fb + 1/S1 \quad (1)$$

$$fb = S1 \cdot S2/(S1-S2) \quad (2)$$

When the distance S2 is ∞, from Eq. (1) the following equation is obtained:

$$S1 = -fb(\infty)$$

where fb(∞) is the focal length of the second objective lens 19 when the distance S2 is ∞.

Therefore, substituting S1=−fb(∞) into Eq. (2) gives $$fb = -S2 \, fb(\infty)/(-fb(\infty)-S2)$$

From the above-mentioned equation, the following Eq. (3) is obtained:

$$fb = S2 \cdot fb(\infty)/(fb(\infty)+S2) \quad (3)$$

Therefore, by varying the focal length $f_b$ so that the above-mentioned Eq. (3) is satisfied and if the exit angle $\theta_{out}$ of an outgoing light beam is constant, the position at which the image of a laser light beam is formed can be varied. This is because the distance Si from the light source image $S_O$ to the position PO2 of the principal plane H of the second objective lens 19 is fixed at S1=−fb(∞)=1.

That is, a laser beam direction correcting optical system for a surveying instrument according to the present invention is equipped with an exit angle correcting means 17 which corrects the exit angle of an outgoing laser light in accordance with an inclination of an instrument main body so that the outgoing laser light is oriented in a specific direction, and an incident angle correcting means 3 provided between the laser light source 1 and the exit angle correcting means 17 to correct the incident angle of laser light incident upon the exit angle correcting means 17 in accordance with the inclined position of the instrument main body. And in the above-mentioned laser beam direction correcting optical system, if the position of the principal plane H of the second objective lens 19 of the exit angle correcting means 17 on the optical axis is fixed and if a variable-focus lens is employed for varying the position at which the image of laser light is formed, the image of laser light can be formed in an irradiated object while correction accuracy degradation in the exit angle of an outgoing light beam is being avoided.

Second Embodiment

Figure 3:
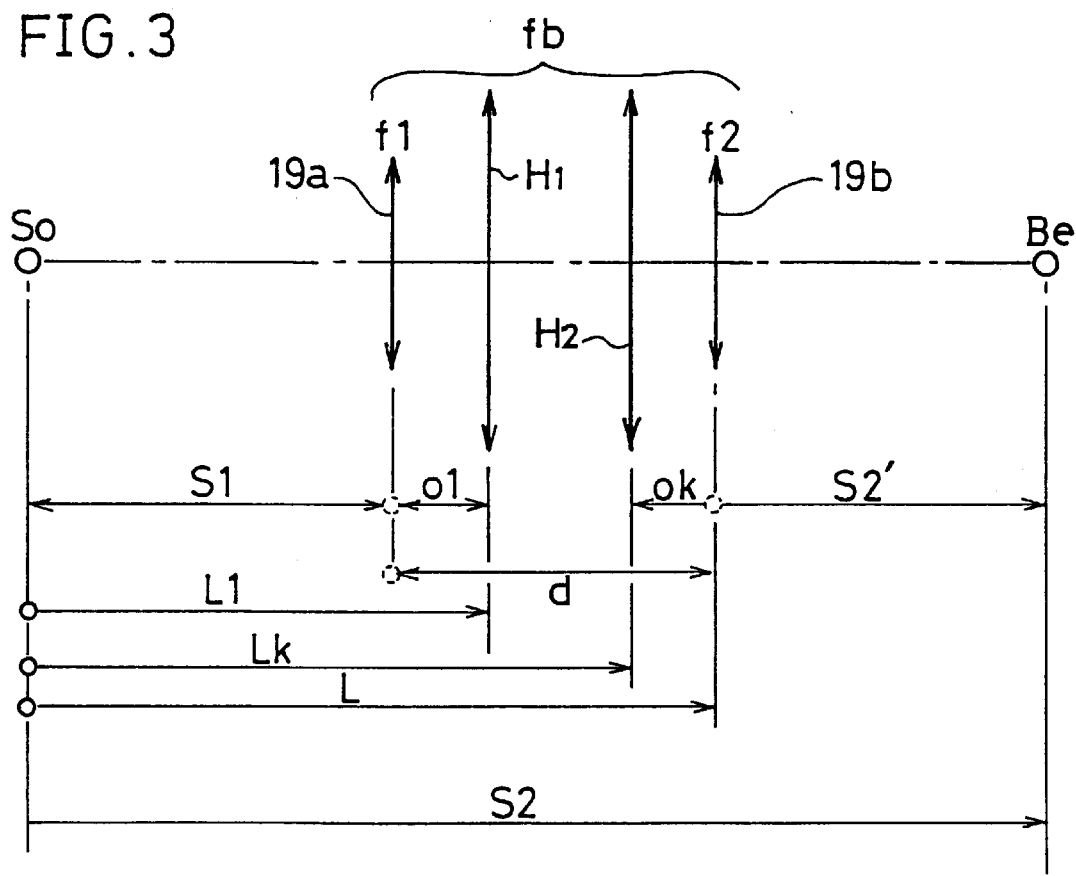
FIG. 3 is an optical schematic diagram of a second embodiment of the present invention.
Figure 11:
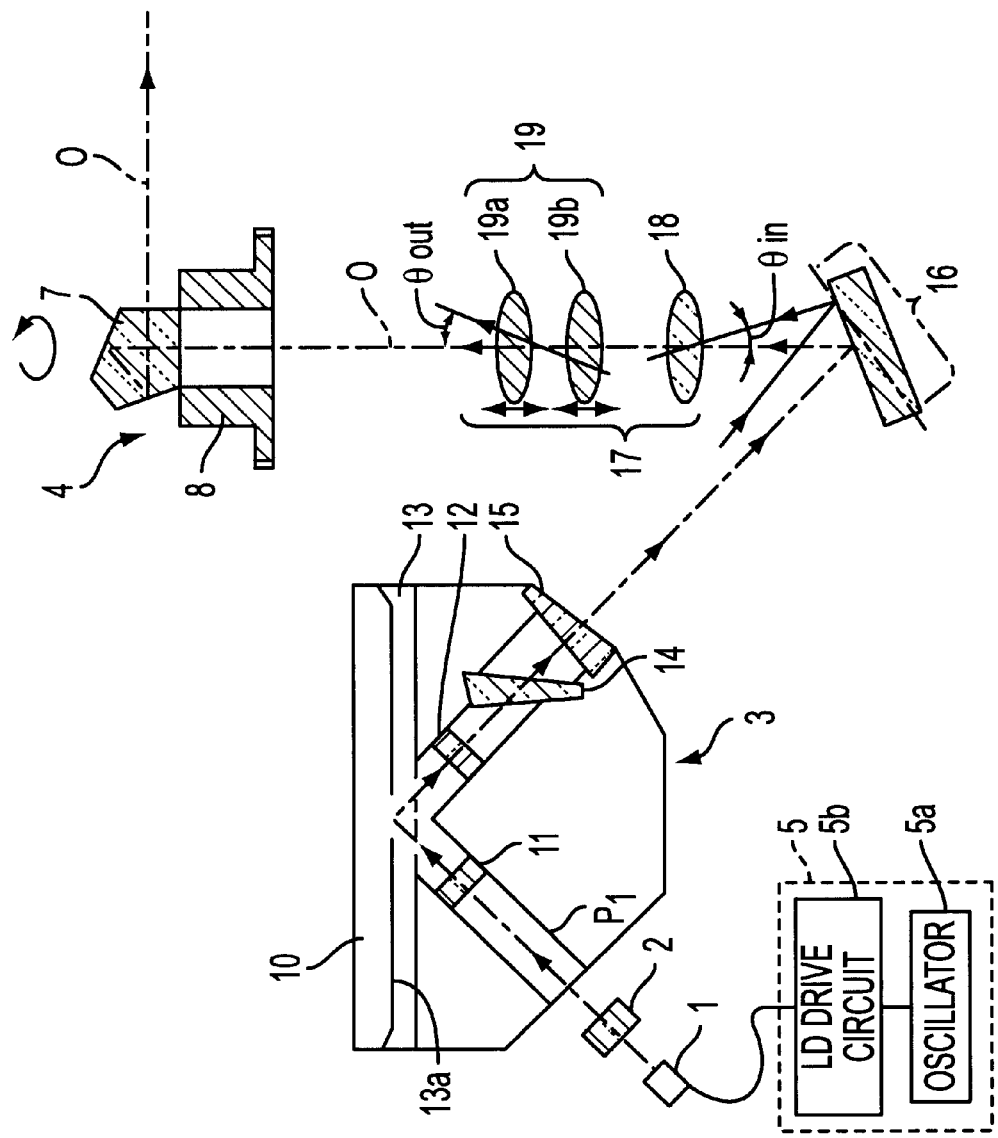
FIG. 11 shows a laser beam correcting system using lens configuration from FIG. 3.

In a second embodiment of the present invention, as shown in FIG. 3 and FIG. 11, the second objective lens 19 is constituted by a front lens 19a and a rear lens 19b. These lenses 19a and 19b are provided with a space d on an optical axis thereof. The space d used herein means a distance from the center of the front lens 19a to the center of the rear lens 19b. Assuming the focal lengths of the lenses 19a and 19b are f1 and f2, the focal length f of the complex lens is $$1/f = (1/f1) + (1/f2) - d/(f1 \cdot f2)$$

From the above equation the space d is $$d = -(f1 \cdot f2)/f + (f1+f2) \quad (4)$$

Also, assuming a distance from the front lens 19a to the front principal plane H1 of the complex lens is $_O1$, and that a distance from the rear lens 19b to the rear principal plane H2 is $_Ok$, $_O1$ and $_Ok$ are $$_O1 = d \cdot f1/(f1+f2-d)$$

$$_Ok = -f2/(f1 + f2_O - d)$$

Furthermore, a distance from the front lens 19a to a light source image $S_O$ is taken to be S1, and a distance from the rear lens 19b to an image formed position is taken to be S2'. Assuming the direction from $S_O$ toward Be is positive and that the direction from Be toward $S_O$ is negative, an image forming equation can be expressed as:

$$S2' = f2 \cdot ((f1 \cdot S1/(S1+f1)) - d)/((f1 \cdot S1/(S1+f1) - d + f2) = f2 \cdot (f1 \cdot S1 - d(S1+f1))/(f1 \cdot S1 + (f2-d) \cdot (S1+f1)) \quad (5)$$

Also, the following equations are obtained.

$$L1 = -S1 + _O1$$

$$L_k = L + _Ok$$

where L1 is the distance from the light source image $S_O$ to the front principal plane H1 of the complex lens, Lk is the distance from the light source image $S_O$ to the rear principal plane H2 of the complex lens, and L is the distance from the light source image $S_O$ to the rear lens 19b.

Here, even if the complex focal length fb of the complex lens based on the focal lengths f1 and f2 is varied, the exit angle $\theta_{out}$ of the laser light beam emerging from the complex lens will not vary if the position of the front principal plane H1 on the optical axis (i.e., distance L1 from the light source image $S_O$) is constant.

When S2'=∞, L1=f(∞) must be satisfied.
Therefore, $$S1 = -(f(\infty) - O1) \quad (6)$$

The distance L from the light source image $S_O$ to the rear lens 19b is $$L = -S1 + d \quad (7)$$

Therefore, if at least one of the lenses 19a and 19b is moved along the optical axis while Eq. (6) is being satisfied and if the lens-to-lens space d computed from Eq. (4) is varied to vary the complex focal length f, then the position at which the image of laser light is formed can be varied while the exit angle $\theta_{out}$ out of the laser light beam emerging from the complex lens is maintained constant.

However, the distance S2' varies the lens-to-lens space d, so the distance S2 measured from the light source image $S_O$ will vary by ΔS2'. But, this quantity of variation ΔS2' is very small as compared with S2', so it becomes negligible.

Figure 4:
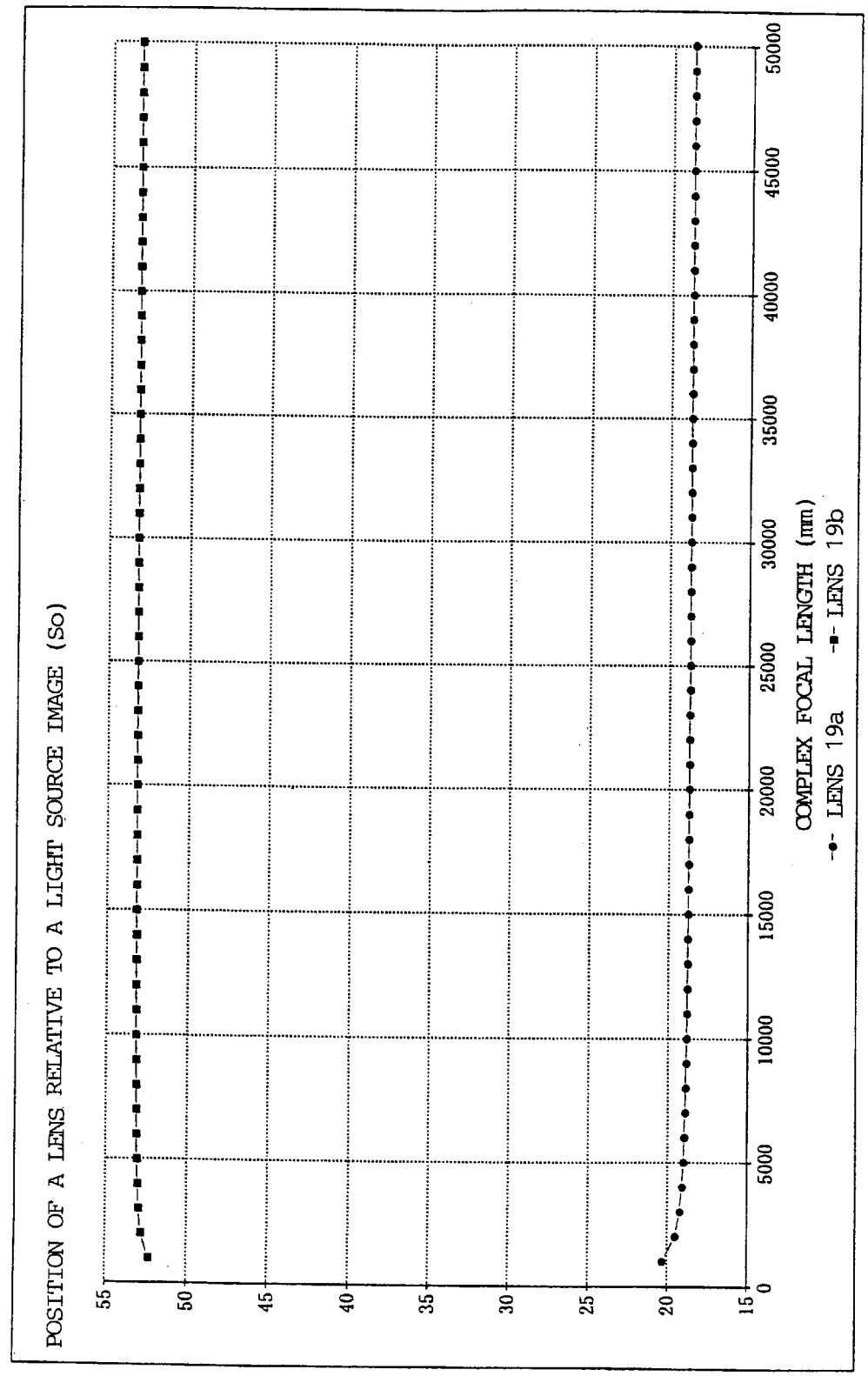
FIG. 4 is a graph showing how the position of a lens relative to a light source image is varied when the complex focal length shown in FIG. 3 is varied.
Figure 5:
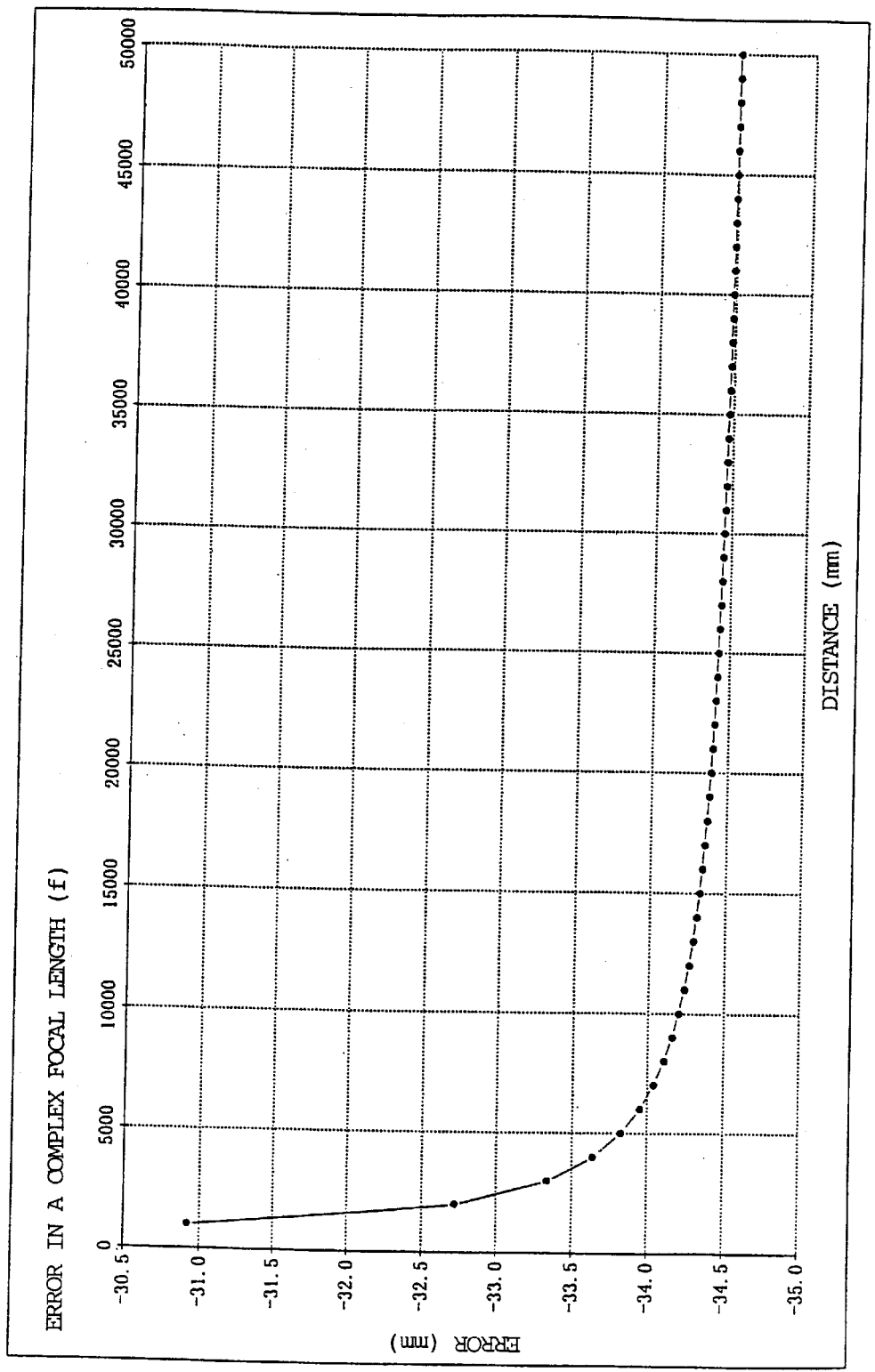
FIG. 5 is a graph used to explain an error in the complex focal length shown in FIG. 3.

For instance, consider the case where the focal lengths f1 and f2 of the lenses 19a and 19b are 34.58 mm and 75 mm. If the distance from a light source to an image formed position is varied, the position of the front lens 19a relative to the light source image $S_O$ and the position of the rear lens 19b relative to the light source image $S_O$ will vary as shown in FIG. 4. Also, an error in the complex focal length of the complex lens consisting of lenses 19a and 19b varies as shown in FIG. 5, and each numerical value varies as shown in Table 1.

Third Embodiment

In the second embodiment of the present invention it has been described that the distance L1 from the light source image $S_O$ to the front principal plane H1 of the complex lens is constant. In the case of the optical system of a surveying instrument, water-proof and dust-proof structure is adopted in the second objective lens 19, so it is desirable to adopt internal focusing structure in which the rear lens 19b is stationary but the front lens 19a is movable.

Hence, in the aforementioned Eq. (7), L=−S1+d is made constant.

From Eq. (7), the following equation is obtained.

$$S1 = d - L \tag{8}$$

Therefore, if the front lens 19a is moved so that the distance L is constant, the distance S1 will be varied and a complex focusing function can be provided while the exit angle $\theta_{out}$ is being maintained substantially constant.

In practice, since the distance L1 from the light source image $S_O$ to the front principal plane H1 of the complex lens varies, the angular magnification r varies and therefore the exit angle $\theta_{out}$ varies Δθ. But, the variation in the distance L1 is very small as compared with the movement quantity of the front lens 19a, so it becomes negligible.

Figure 6:
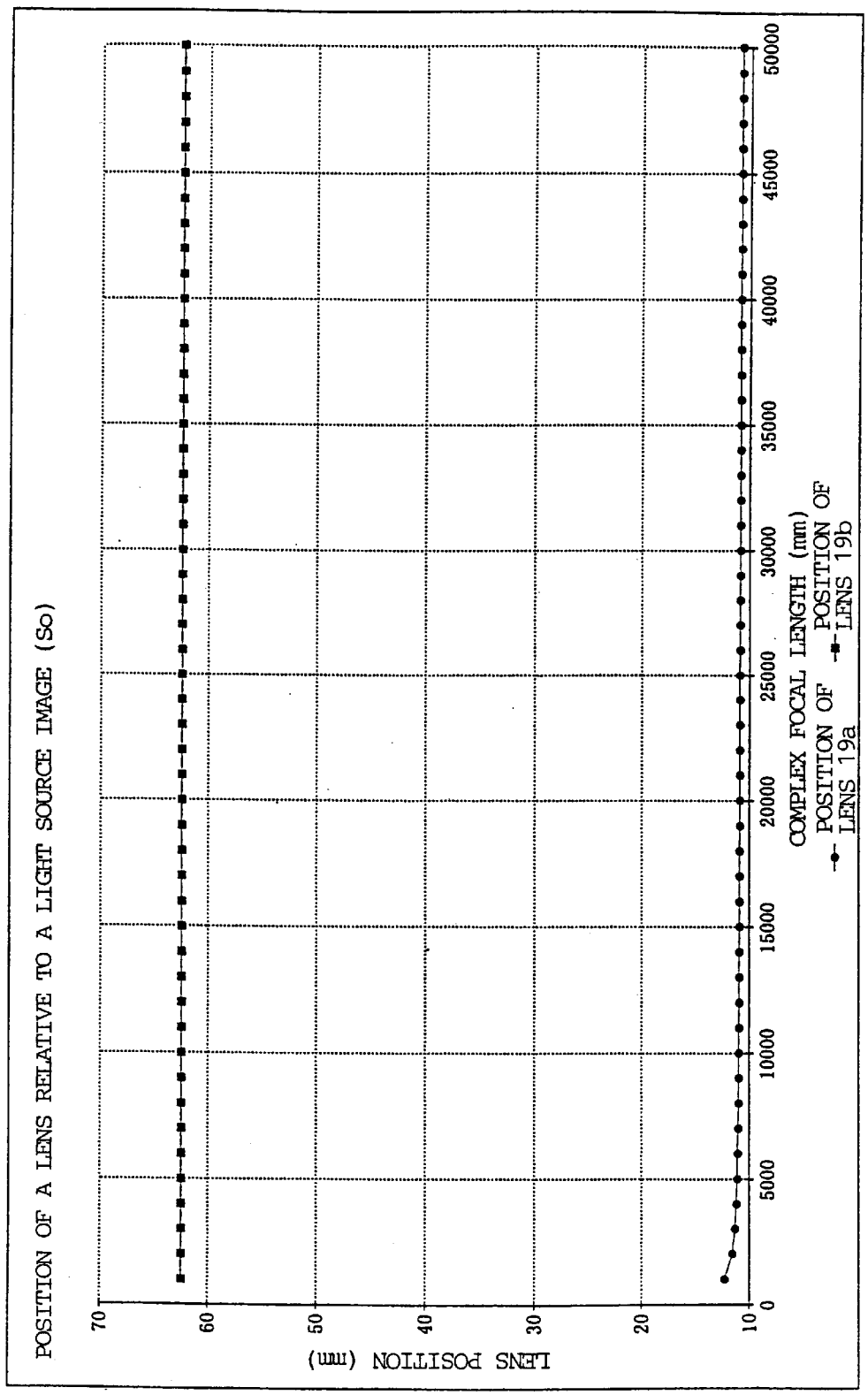
FIG. 6 is a graph showing how the positions of lenses relative to a light source image are varied when a complex focal length according to a third embodiment of the present invention is varied.
Figure 7:
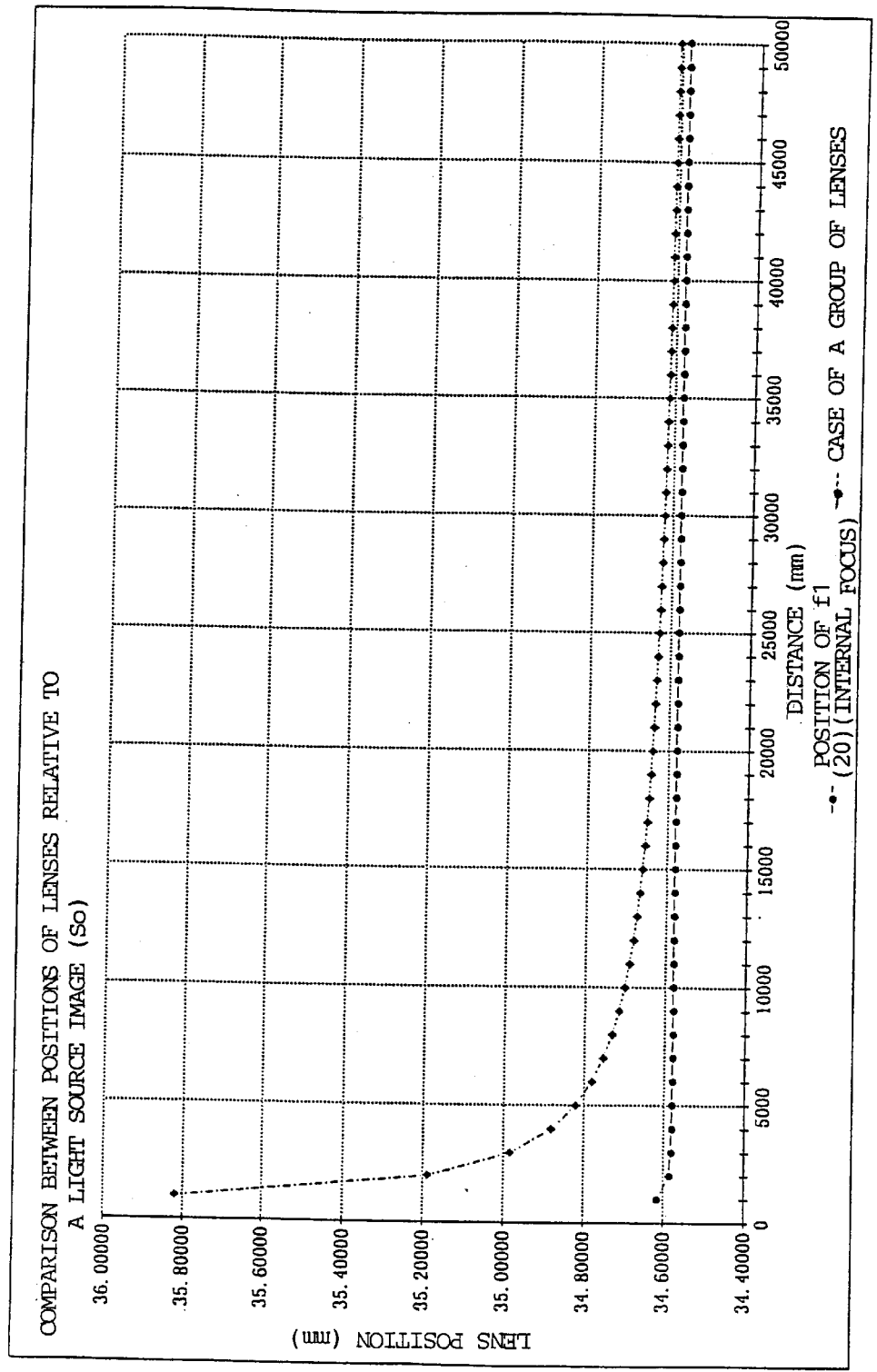
FIG. 7 is a graph showing the variation in the distance from a light source image to the front principal plane of a complex lens in comparison with a group of lenses.
Figure 8:
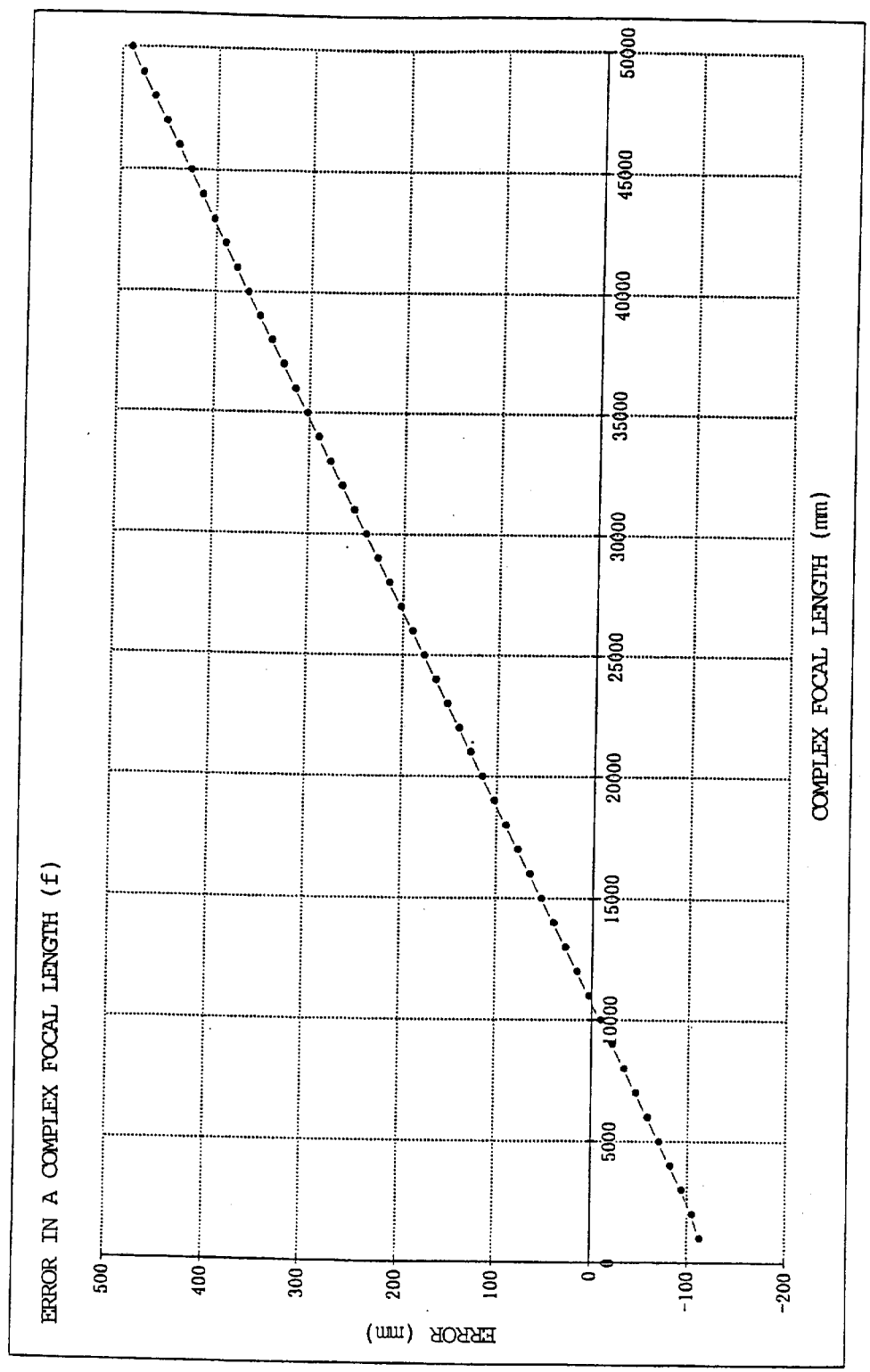
FIG. 8 is a graph used to explain an error in the complex focal length according to the third embodiment of the present invention.
Figure 9:
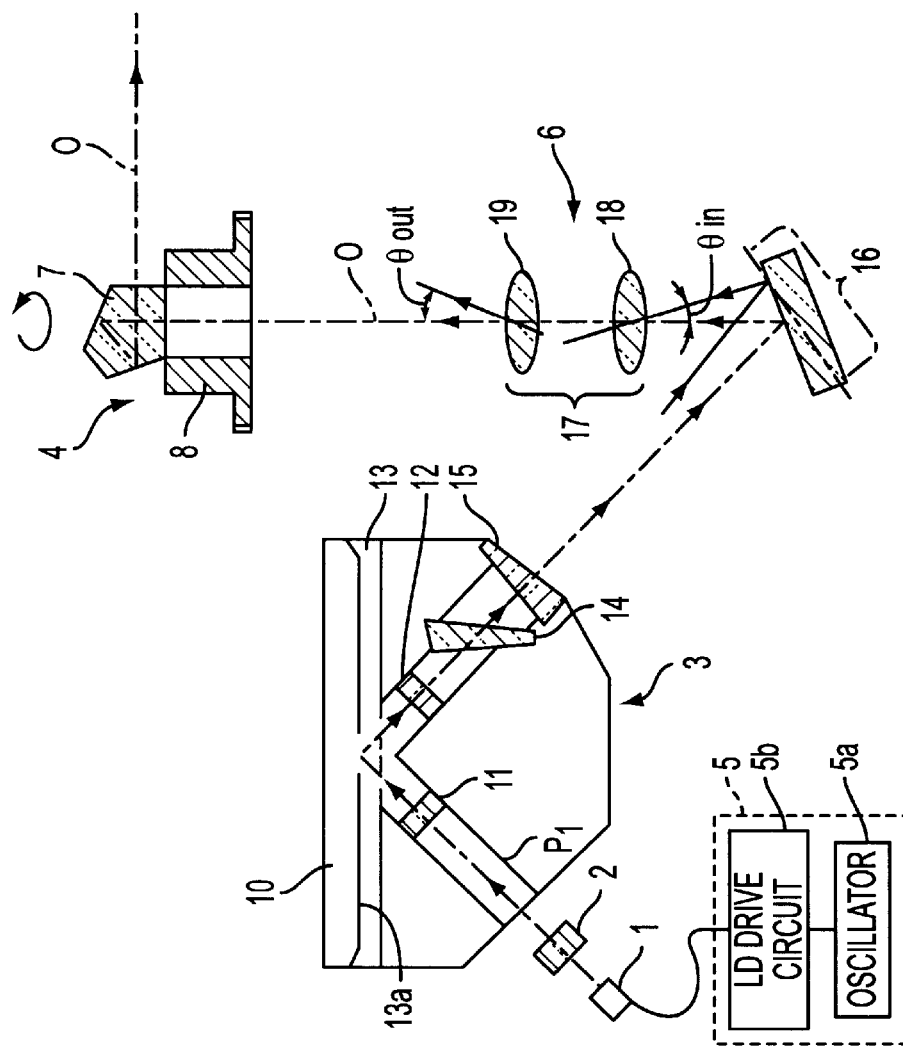
FIG. 9 is a diagram showing a conventional laser beam direction correcting optical system.

For instance, consider the case where the focal lengths f1 and f2 of the lenses 19a and 19b are 20 mm and 75 mm. Each numerical value in this case is shown in Table 2. The position of the front lens 19a relative to the light source image $S_O$ and the position of the rear lens 19b relative to the light source image $S_O$ are shown in FIG. 6. The variation in the distance L1 is shown in FIG. 7 in comparison with a group of lenses. Furthermore, an error in the complex focal length of the complex lens is shown in FIG. 8.

Since the laser beam direction correcting optical system for a surveying instrument according to the present invention is constituted as described above, the correcting optical system is capable of forming the image of laser light in an irradiated object while avoiding correction accuracy degradation in the exit angle of an outgoing light beam.

While the present invention has been described with reference to preferred embodiments thereof, the invention is not to be limited to the details given herein, but may be modified within the scope of the appended claims.

What is claimed is:

1. A laser beam direction correcting optical system for a surveying instrument, comprising:

a laser beam light source for emitting a laser beam;

exit angle correcting means for correcting an exit angle of said laser beam emerging therefrom in accordance with an inclination of an instrument main body so that said laser beam is oriented in a specific direction; and incident angle correcting means provided between said laser light source and said exit angle correcting means, for correcting an incident angle of said laser beam incident upon said exit angle correcting means in accordance with said inclination of said instrument main body;

wherein said exit angle correcting means comprises two groups of objective lenses and another objective lens, which is arranged between said incident angle correcting means and said two groups of objective lenses, and a position of a complex principal plane of said two groups of objective lenses on an optical axis thereof is fixed against to an image forming position of said another objective lens.

2. The laser beam direction correcting optical system as set forth in claim 1, wherein at least one of said two groups of objective lenses is movable along said optical axis.

3. The laser beam direction correcting optical system as set forth in claim 1, wherein among said two groups of objective lenses, a first objective lens located near said laser light source is movable.

4. A laser beam direction correcting optical system for a surveying instrument, comprising:

a light source emitting a laser beam;

exit angle correcting means for correcting an exit angle of said laser beam emerging therefrom in accordance with an inclination of an instrument main body so that said laser beam is oriented in a specific direction; and incident angle correcting means provided between said light source and said exit angle correcting means, for correcting an incident angle of said laser beam incident upon said exit angle correcting means in accordance with said inclination of said instrument main body;

wherein said exit angle correcting means includes a first objective lens, a second objective lens, and a third objective lens, wherein said first objective lens is located on an optical axis between said second and third lenses and said incident angle correcting means, wherein said second and third lenses form a complex lens, and wherein a position of a complex principal plane of said second and third objective lens on said optical axis thereof is fixed against to an image forming position of said first objective lens.

5. The laser beam direction correcting optical system as set forth in claim 4, wherein, when a focal length of said complex lens is varied, said exit angle does not vary when a position of a front principal plane on said optical axis is constant.

* * * * *